United States Patent [19]
Stamps et al.

[11] Patent Number: 6,009,983
[45] Date of Patent: Jan. 4, 2000

[54] METHOD AND APPARATUS FOR IMPROVED VIBRATION ISOLATION

[75] Inventors: Frank B. Stamps; Michael R. Smith, both of Colleyville, Tex.

[73] Assignee: Bell Helicopter TEXTRON, Inc., Fort Worth, Tex.

[21] Appl. No.: 08/866,603

[22] Filed: May 30, 1997

[51] Int. Cl.$^7$ ........................................................ F16F 9/04
[52] U.S. Cl. ...................................... 188/298; 188/322.15
[58] Field of Search .............................. 188/322.15, 317, 188/298, 316, 322.13, 378, 322.22; 244/17.27

[56] References Cited

U.S. PATENT DOCUMENTS

| | | | |
|---|---|---|---|
| 2,957,703 | 10/1960 | Ross | 280/124 |
| 3,003,594 | 10/1961 | De Carbon | 188/322.15 X |
| 3,105,574 | 10/1963 | Hoffmann et al. | 188/298 X |
| 3,140,085 | 7/1964 | De Carbon | 188/298 X |
| 3,220,517 | 11/1965 | Lorenz | 188/322.15 X |
| 3,612,222 | 10/1971 | Minor | 188/1 B |
| 4,236,607 | 12/1980 | Halwes et al. | 188/1 B |
| 4,635,910 | 1/1987 | Ozawa et al. | 267/140.1 |
| 5,435,531 | 7/1995 | Smith et al. | 267/140.11 |
| 5,439,082 | 8/1995 | McKeown et al. | 188/379 |

OTHER PUBLICATIONS

Halwes, D R., "Total Main Rotor Isolation System," Nov. 1981.

Halwes, D R., "Live –Liquid Inertia Vibration Eliminator," May 1980.

*Primary Examiner*—Christopher P. Schwartz
*Assistant Examiner*—Melanie Talavera
*Attorney, Agent, or Firm*—Melvin A. Hunn

[57] ABSTRACT

A vibration-isolatator utilizes a relatively small-diameter tuning port or passage and associated reduction in component size. In the illustrative embodiment described herein, a passive isolator is provided which includes a tuning passage or port which has a diameter which is approximately one-half the diameter of the prior-art isolators. The reduced radial dimension of the tuning passage of the isolator results in a remarkable decrease in its size and weight, thus increasing the efficiency of operation of the aircraft.

21 Claims, 2 Drawing Sheets

METHOD AND APPARATUS FOR IMPROVED VIBRATION ISOLATION

BACKGROUND OF THE INVENTION

1. Field of the Invention

The present invention relates generally to a method and apparatus for isolating mechanical vibrations in a structure or body which is subject to harmonic or oscillating displacements or forces, and is of particular utility in the field of aircraft, in particular helicopters.

2. Description of the Prior Art

For many years, effort has been directed toward the design of apparatus for isolating a vibrating body from transmitting its vibrations to another body. Such apparatus are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations (such as harmonic vibrations) which are associated with the propulsion system and which arise from the engine, transmission, and propellers or rotors of the aircraft.

Vibration isolators are distinguishable from dampening devices in the prior art that are erroneously referred to as "isolators." A simple force equation for vibration is set forth as follows:

$$m\ddot{x} + c\dot{x} + kx = F$$

A true vibration isolator utilizes acceleration of a fluid body ($m\ddot{x}$) to cancel the displacement of vibration ($kx$). A dampening device is concerned with restricting flow of a fluid or other body and thus velocity ($c\dot{x}$), and does not cancel vibration, but merely absorbs its frequency.

One important engineering objective during the design of the aircraft vibration-isolation system is to minimize the length, weight and overall size including cross-section of the isolation device. This is a primary objective of all engineering efforts relating to aircraft. It is especially important in the design and manufacture of helicopters, which are required to hover against the dead weight of the craft and which are thus somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters, is disclosed in commonly assigned U.S. Pat. No. 4,236,607, which is entitled "Vibration Suppression System," which issued on Dec. 2, 1980, to Halwes, et al., and which is incorporated herein by reference This patent discloses a vibration isolator in which a dense, low-viscosity fluid is used as the "tuning" mass to counterbalance (or cancel) oscillating forces transmitted through the isolator. This isolator employs the principle that the acceleration of an oscillating mass is 180 degrees out of phase with its displacement.

Halwes, et al. recognized that the inertial characteristics of a dense, low-viscosity fluid, combined with a hydraulic advantage resulting from a piston arrangement, could harness the out-of-phase acceleration to generate counterbalancing forces to attenuate or cancel vibration. This invention provided a much more compact, reliable, and efficient isolator than was provided in the prior art. The original dense, low-viscosity fluid contemplated by Halwes was mercury, which is toxic and highly corrosive. Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, entitled "Hydraulic Inertial Vibration Isolator" which was issued on Aug. 8, 1995 to McKeown, et al.

Several factors affect the performance and characteristics of the Halwes-type isolator, including the density and viscosity of the fluid employed, the relative dimensions of components of the isolator, and the like. Improvements in the design of such isolators that permit reduction in their size and weight, without sacrificing their ability to attenuate or cancel vibration, are needed.

SUMMARY OF THE INVENTION

A general objective of the present invention is to provide a vibration isolation system that may be utilized to minimize or eliminate the transfer of vibration of a particular frequency in an amount equal to or greater than a 90% reduction in vibration. In one particular commercial application of the present invention, the vibration isolator may be utilized to minimize the vibration transmitted from a main rotor pylon of a helicopter to the fuselage of the helicopter.

It is another, more particular, objective of the present invention to provide a vibration-isolation system which utilizes a relatively small-diameter tuning port or passage and associated reduction in component size. In the illustrative embodiment described herein, a passive isolator is provided which includes a tuning passage or port which has a diameter which is approximately one-half the diameter of the prior-art isolators. The reduced radial dimension of the tuning passage of the isolator results in a remarkable decrease in its size and weight, thus increasing the efficiency of operation of the aircraft.

It is yet another particular objective of the present invention to provide the vibration isolator with a relatively small diameter tuning port without elongating the isolator. This also results in a smaller isolator and thereby increases the operating efficiency of the aircraft.

These and other objectives are achieved as is now described. In accordance with the preferred embodiment of the present invention, a vibration isolator is provided which includes a housing which defines a fluid chamber. A fluid is disposed within the chamber. Additionally, a piston is disposed within the chamber. A passage having a predetermined diameter extends through the piston to permit fluid to flow from one end of the chamber to the other end of the chamber. In accordance with the present invention, the passage includes a non-constant diameter section. Preferably, the non-constant diameter section has a length which is greater than the diameter of another portion of the passage. In accordance with the present invention, at least one end of the passage is provided with the non-constant diameter section. In the particular embodiment described herein, the non-constant diameter section represents an enlarged portion of the passage which diminishes the turbulence of fluid flow within the isolator.

Preferably, the relatively enlarged portion is defined by a compound radius which extends over a predetermined length of the passage.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2 and 3 are longitudinal section views of the utilization of the vibration isolation system of the present invention in a helicopter apparatus, with FIG. 3 providing an enlarged view of a portion of the system depicted in FIG. 2.

DETAILED DESCRIPTION OF THE INVENTION

Figure 1:
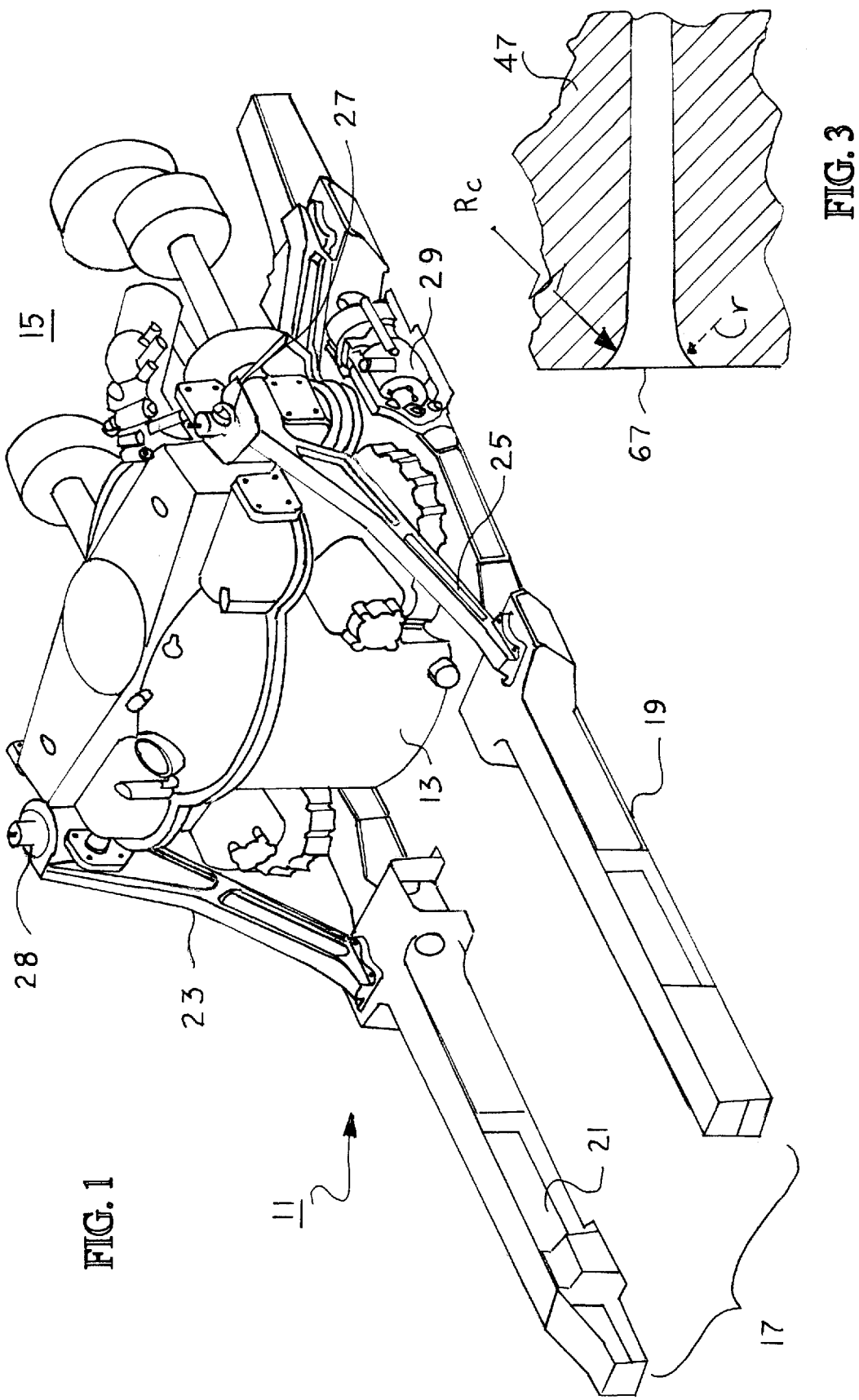
FIG. 1 is a pictorial representation of the utilization of vibration isolation system in a helicopter.

FIG. 1 is a pictorial representation of a rotor pylon portion 11 of a helicopter such as a Model 427 helicopter manufactured by Bell Helicopter Textron, Inc. of Fort Worth, Tex. A transmission 13 transmits power from a power plant 15 (usually a jet turbine engine, not shown) to a rotor assembly (also not shown) to provide lift and propulsion for an airframe 17 including a pair of roof beams 19, 21, and pylons 23, 25 extending upwardly from roof beams 19, 21, to connect transmission 13 to a fuselage formed about, and suspended from, roof beams 19, 21. A plurality of vibration isolators are provided in order to minimize the transmission or conduction of vibration from the propulsion system 13 to the fuselage 17. The vibration isolators include a pair of vertical vibration isolators 27, 28 and a pair of horizontal or fore/aft vibration isolators 29, 30 (one of which is obscured from view in FIG. 1). Other vibration isolators may also be provided in a manner consistent with the prior-art conventions to ensure that the transmission of vibration from transmission is minimized.

Figure 2:
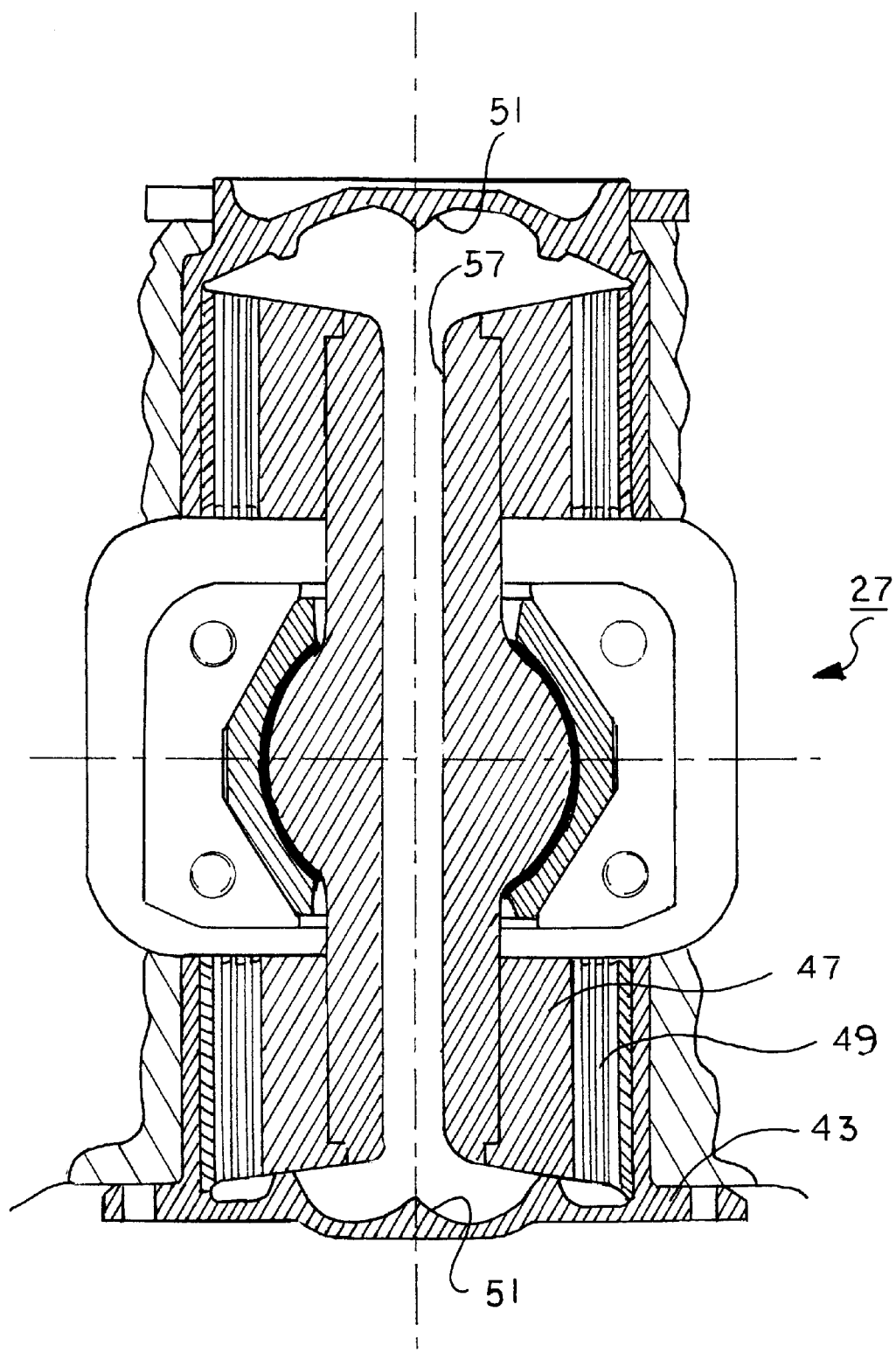

FIG. 2 is a longitudinal section view of a vibration isolator 27 according to the present invention. The isolator comprises a housing 43 that has a hollow, generally cylindrical interior. A piston 47 of selected cross-sectional diameter is disposed within the interior of housing 43. Housing 43 is coupled to roof beam 19 (not shown) of the helicopter airframe (the body to be isolated from vibration), while piston 47 is coupled to transmission 13 (the vibrating body). An elastomer seal and spring member 49 seals and resiliently seals piston 43 within the interior of housing 43.

A fluid chamber is defined by the interior of housing 43 and piston 47 and is sealed against leakage by elastomer member 49. A known-density (comparable to the density of water), low-viscosity vibration-isolation fluid is disposed in the fluid chamber defined by housing 43, cap 45, piston 47 and elastomer member 49. The preferred isolation fluid is manufactured by Lord Corporation. In addition to sealing the isolation fluid in the fluid chamber, elastomer member 49 functions as a spring to permit piston 47 to move or oscillate relative to housing 43, while maintaining piston 47 in a central location in housing 43 when no load is applied.

A tuning port or passage 57 extends centrally through piston 47 and permits the isolation fluid to move from one end of the fluid chamber to the other (each end of the fluid chamber could also be regarded as a separate chamber). A conical flow diverter is provided at each end of housing 43 and is aligned with and generally opposes the opening at each end of tuning passage 57. Each diverter enhances fluid flow by decelerating the isolation fluid as it flows from each end of the fluid chamber into and out of passage 57.

FIG. 3 is an enlarged section view of a portion of piston 47 of FIG. 2. Specifically, FIG. 3 illustrates the opening or entrance 67 at each end of tuning passage 57 of piston 47 of FIG. 2. In conventional or prior-art isolators, the intersection between the wall of tuning passage 57 and the end wall of piston 47 is provided with a fixed or constant radius r that is conventionally no larger than the nominal or minimum radius (½ the nominal or minimum diameter D) of tuning passage 57. This conventional practice is illustrated in phantom or hidden lines in FIG. 3. This radius provides a flared or tapered opening that extends no deeper along the length of passage 57 than the radius provided at each end of passage 57. In other words, the flared or tapered portion extends no deeper into passage 57 than the nominal diameter radius r of the passage (when the radius r is equal to or less than one-half of diameter D). This prior-art radius, combined with fluid flow diverters 51, is believed to enhance fluid flow through passage 57.

According to the preferred embodiment of the present invention, passage 57 is circular in cross-section. Nevertheless, one quantity of interest in vibration isolator design is the ratio of the cross-sectional area of passage 57 to the cross-sectional area of piston 47 that operates upon the isolation fluid. This ratio creates the hydraulic advantage necessary to proper function of isolator 27 and largely determines the isolation frequency of the isolator. Thus, diameter is used herein as shorthand for the area of a circular passage. Nevertheless, neither passage 57 nor piston 47 need be circular in cross-section.

Vibration isolator 27 according to the present invention relies on the transfer of inertia from the vibrating structure to housing 43, piston 47 suspended on spring 49, and the isolation fluid to attenuate vibration. Damping in the form of viscous or frictional fluid losses as the isolation fluid travels within isolator 27 only degrades the performance isolator 41 according to the present invention. Thus, fluid flow dynamics within the interior or fluid chamber of isolator 27 are a significant characteristic of the performance of isolator 27.

In the conventional or prior-art vibration isolator designs, the tuning passage has been straight, long, and substantially uniform in diameter, in order to maximize the region of the tuning passage that is straight and constant-diameter to allow for a greater mass of fluid that is accelerated.

It has been determined empirically that replacing the constant-radius orifice or entrance 67 of tuning passage 57 with an entry 67 of variable radius $R_c$ results in a marked improvement in the performance of isolator. Specifically, the orifice or entrance at each end of tuning passage 57 is provided with a compound radius $R_c$, which provides a tuning passage having a non-constant diameter. According to the preferred embodiment of the present invention, the non-constant radius $R_c$ extends to a depth in tuning port or passage 57 greater than the nominal or minimum radius (one-half the nominal diameter D) of passage 57. This compound radius is applied or formed at each end of passage 57.

According to the preferred embodiment of the present invention, for a tuning passage 57 having a nominal or minimum diameter D of approximately 0.281 inch, a radius of 1.5 inch is applied or formed tangent to the wall of passage 57 and extending a distance or depth of 0.475 inch into the passage. A 0.188 inch radius then is applied or formed tangent to the end face of piston 47 and the 1.5 inch radius to yield a compound radius $R_c$ that extends to a depth within passage in excess of the nominal or minimum radius r (0.141 inch) of passage 57.

Provision of the compound radius according to the present invention is believed to reduce turbulence in the isolation fluid flowing within isolator 41, thus increasing the efficiency of isolator 41 for a given set of dimensions. The reduction in turbulence also reduces cavitation in the isolation fluid at high frequencies, which degrades the inertia properties of the fluid. Isolator 41 according to the preferred embodiment of the present invention isolates vibration to the same degree (over 90%) as a conventional isolator (with a constant radius at each end of the tuning passage) having a nominal passage diameter D and a corresponding effective (cross-sectional) piston area nearly twice as large. Because the cross-sectional area of passage 57, piston 47, and housing 43 may be reduced according to the present invention, the size and weight of isolator 27 may be reduced accordingly. This reduction in cross-section is achieved without increasing the length of passage 57 (7.5 inch according to the preferred embodiment of the present invention).

While the invention has been shown in only one of its forms, it is not thus limited but is susceptible to various changes and modifications without departing from the spirit thereof.

What is claimed is:

1. A vibration isolator comprising:
   a housing defining a fluid chamber;
   a fluid disposed in the chamber;
   piston disposed in the chamber and dividing it into two volumes;
   a passage permitting fluid flow from one volume of the fluid chamber to another, the passage having a uniform cross-sectional area; and
   a compound radius located at each end of the passage and extending over a predetermined portion of the length of the passage.

2. The vibration isolator according to claim 1 further comprising:
   a non-flexible conical flow diverter secured to the chamber opposing and coaxial with said compound radius.

3. The vibration isolator according to claim 1 wherein the housing is coupled to an isolated object.

4. The vibration isolator according to claim 1, wherein the piston is coupled to an isolated object.

5. The vibration isolator according to claim 1, wherein the passage is circular in cross-section.

6. The vibration isolator according to claim 1, wherein the passage extends through the piston.

7. A vibration isolator comprising:
   a housing defining a fluid chamber;
   a fluid disposed in the chamber;
   a piston disposed in the chamber and dividing it into two volumes;
   a passage having a minimum cross-sectional area extending coaxially with the piston to permit flow of fluid from one volume of the chamber to another;
   said passage having a constant cross-sectional area over a length of the passage that is substantially as long as the piston and a non-constant cross-sectional area having a compound radius over a length of the passage that is longer than the minimum diameter of the passage.

8. The vibration isolator according to claim 7 further comprising:
   an orifice located at each end of the passage;
   said orifice having a non-constant compound radius over a length greater than the minimum diameter of the passage.

9. The vibration isolator according to claim 8 further comprising:
   a non-flexible conical flow diverter secured to the housing within the chamber and opposing the orifice;
   said non-flexible conical flow diverter being coaxial with the passage.

10. The vibration isolator according to claim 7 wherein the housing is coupled to a vibrating object.

11. The vibration isolator according to claim 7, wherein the piston is coupled to an isolated object.

12. The vibration isolator according to claim 7, wherein the passage is circular in cross-section and extends through the piston.

13. A vibration isolator comprising:
   a housing defining a fluid chamber and adapted for coupling to one of a vibrating and an isolated object;
   a piston disposed in the housing and adapted for coupling to another of the vibrating and the isolated object;
   a fluid filling the housing;
   a passage extending through the piston and having a minimum diameter to permit flow of the fluid from one end of the housing to another;
   said passage having at each end a non-constant compound radius over a portion of its length greater than the minimum diameter of the passage.

14. The vibration isolator according to claim 13 further comprising:

an orifice located at each end of the passage;

said orifice having a non-constant compound radius over a length greater than the minimum diameter of the passage.

15. The vibration isolator according to claim 14 further comprising:

a non-flexible conical flow diverter secured to the housing within the chamber and opposing said orifice and being coaxial with the passage.

16. The vibration isolator according to claim 13 wherein the housing is coupled to a vibrating object.

17. The vibration isolator according to claim 13, wherein the piston is coupled to an isolated object.

18. A method of isolating an isolated object from a vibrating object comprising the method steps of:

providing a housing which is mechanically coupled to said isolated object and said vibrating object with said housing defining a fluid chamber filled with fluid;

providing a piston in said fluid chamber;

forming a tuning passage coaxial with said piston which includes an enlarged region at each end of said passage, with said enlarged region having a length which is longer than a minimum diameter of said passage and a compound radius which is substantially non-constant;

moving fluid within said tuning passage in response to vibration of said vibrating object in a manner which substantially diminishes the vibration received at said isolated object.

19. A method according to claim 18 wherein said diameter of said tuning passage at said enlarged region is defined by a plurality of differing curative dimensions.

20. A method according to claim 18 wherein said diameter of said tuning passage at said enlarged region is defined by at least three differing curative dimensions.

21. A method according to claim 19 further comprising:

providing a non-flexible fluid flow diverter adjacent said enlarged region of said tuning passage; and diminishing turbulence with said fluid chamber by diverting fluid flow with said non-flexible fluid flow diverter.

* * * * *